US012641414B2

(12) United States Patent
Perarnau

(10) Patent No.: US 12,641,414 B2
(45) Date of Patent: May 26, 2026

(54) DELEGATED eUICC PROFILE MANAGEMENT

(71) Applicant: Giesecke+Devrient Mobile Security Germany GmbH, Munich (DE)

(72) Inventor: Xavier Perarnau, La Roca del Valles (ES)

( * ) Notice: Subject to any disclaimer, the term of this patent is extended or adjusted under 35 U.S.C. 154(b) by 314 days.

(21) Appl. No.: 18/683,143

(22) PCT Filed: Aug. 9, 2022

(86) PCT No.: PCT/EP2022/072346
§ 371 (c)(1),
(2) Date: Feb. 12, 2024

(87) PCT Pub. No.: WO2023/017031
PCT Pub. Date: Feb. 16, 2023

(65) Prior Publication Data
US 2024/0349032 A1      Oct. 17, 2024

(30) Foreign Application Priority Data

Aug. 12, 2021    (EP) ..................................... 21382759

(51) Int. Cl.
*H04W 8/18* (2009.01)
(52) U.S. Cl.
CPC .................................. *H04W 8/183* (2013.01)
(58) Field of Classification Search
None
See application file for complete search history.

(56) References Cited

U.S. PATENT DOCUMENTS

| | | | |
|---|---|---|---|
| 2014/0038563 A1 | 2/2014 | O'Leary | |
| 2014/0219447 A1 | 8/2014 | Park et al. | |
| 2017/0149827 A1* | 5/2017 | Sims ..................... | H04L 63/102 |
| 2018/0206123 A1 | 7/2018 | Guday et al. | |
| 2020/0288300 A1 | 9/2020 | Oswal et al. | |

FOREIGN PATENT DOCUMENTS

| | | |
|---|---|---|
| CA | 3119708 A1 | 8/2021 |
| KR | 20130026351 A | 3/2013 |

OTHER PUBLICATIONS

GSMA, "GSM Association Non-confidential Official Document SGP.22—SGP.22 RSP Technical Specification", Version 2.2.2, Jun. 5, 2020, 268 pages.
GSMA, "RSP Technical Specification", "GSMA eSIM Group feedback on the request from ETSI TC SCP", European Telecommunications Standards Institute (ETSI), vol. 3.0, Draft 18, Jul. 17, 2019, 409 pages.

(Continued)

*Primary Examiner* — Gary Lafontant
(74) *Attorney, Agent, or Firm* — Workman Nydegger

(57) ABSTRACT

Methods, interfaces and devices for delegated management of profiles of an embedded Universal Integrated Circuit Card, eUICC, are included in a mobile device. Delegated management is provided to a profile selected from a list of profiles available at the eUICC by registering the eUICC with a server and joining with the selected profile an existing subscription group of profiles on the server or by creating a new subscription group on the server based on the selected profile.

15 Claims, 9 Drawing Sheets

(56) References Cited

OTHER PUBLICATIONS

Extended European Search Report from Corresponding European Patent Application No. EP21382759.5, Feb. 3, 2022.
International Search Report from Corresponding PCT Application No. PCT/EP2022/072346, Nov. 23, 2022.
International Preliminary Report on Patentability for Corresponding PCT Application No. PCT/EP2022/072346, Nov. 22, 2023.

* cited by examiner

200

S11 — Obtain an EID (eUICC Identifier) from the eUICC

S12 — Request eUICC to create a key pair

S13 — Obtain the public key from the eUICC

S14 — Generate a certificate signing request, csr, using the public key

S15 — Register the EID, the device name, and the crs with the PTGS

S16 — Receiving from the PTGS a certificate signed by a Certificate Authorithy

S17 — Store the certificate

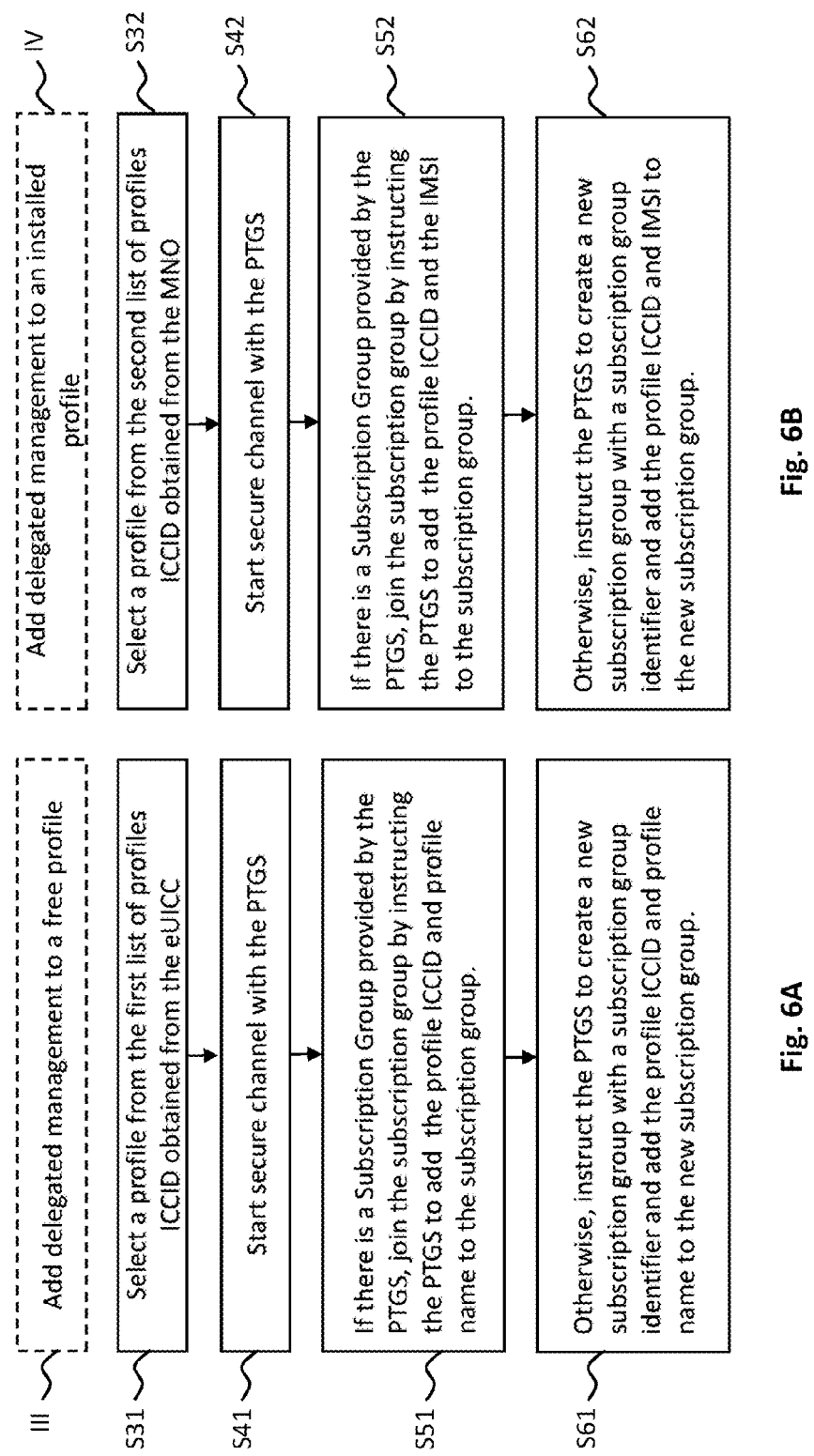

III

Add delegated management to a free profile

S31 — Select a profile from the first list of profiles ICCID obtained from the eUICC S41 — Start secure channel with the PTGS S51 — If there is a Subscription Group provided by the PTGS, join the subscription group by instructing the PTGS to add the profile ICCID and profile name to the subscription group.

S61 — Otherwise, instruct the PTGS to create a new subscription group with a subscription group identifier and add the profile ICCID and profile name to the new subscription group.

Add delegated management to an installed profile

S32 — Select a profile from the second list of profiles ICCID obtained from the MNO S42 — Start secure channel with the PTGS S52 — If there is a Subscription Group provided by the PTGS, join the subscription group by instructing the PTGS to add the profile ICCID and the IMSI to the subscription group.

S62 — Otherwise, instruct the PTGS to create a new subscription group with a subscription group identifier and add the profile ICCID and IMSI to the new subscription group.

Fig. 6B

DELEGATED eUICC PROFILE MANAGEMENT

FIELD OF THE DISCLOSURE

The present invention relates to a method and a device for managing a plurality of profiles for eUICC (embedded Universal Integrated Circuit Cards) and, more particularly, to a method and a device for delegated eUICC profile management.

BACKGROUND OF THE INVENTION

Recently, mobile devices configured to employ electronic subscriber profiles for communicating on mobile networks have emerged. Such mobile devices are typically equipped with electronic/embedded secure element devices, such as electronic/embedded universal integrated circuit cards (eUICCs), configured to store one or more electronic subscriber profiles such as electronic subscriber identification module (eSIM) profiles that may allow mobile devices to connect to one or more mobile networks. A subscriber profile (e.g., eSIM profile) may be generated by a mobile network operator (MNO) and may be downloaded to a mobile network device. The subscriber profile may then be installed on a secure element of the mobile device and used for communication over a corresponding mobile network by the mobile device.

FIG. 1 shows a simplified representation of the architecture of a remote eSIM provisioning system as described in SGP.22 RSP Technical Specification, Version 2.2.2, issued by the GSM Association. The eSIM provisioning system 100 is organized around several elements: the SM-DP+ (Subscription Manager—Data Preparation and Secure Routing, 110), the SM-DS (Subscription Manager—Discovery Server, 150), the LPA (Local Profile Assistance, 142) and the eUICC, 141, the latter being part of a mobile device 140, of an end user 130. The SM-DP+ is responsible for the creation, download, remote management (enable, disable, update, delete) and the protection of subscriber profiles provided by the MNO 120. The LPA (Local Profile Assistant, 142) is a set of functions in the device 140 responsible for providing the capability to download (encrypted) profiles to the eUICC 141. It also presents the local management end user interface to the end user 130 so they can manage the status of profiles on the eUICC 141. The SM-DS 150 provides means for the SM-DP+ 110 to communicate with the eUICC 141.

Current solutions for profile management by the MNO involve the MNO creating a profile which is then linked to the unique identifier EID of the eUICC 141, the profile is to be downloaded onto. Once the mobile device 140 containing the eUICC 141 has access to the SM-DP+ 110, it will start downloading and subsequently using the profile. If the device 140 stops using the profile, the MNO 120 will release it from the EID, and the profile is ready to be used by another eUICC. Such a solution is for instance known from the patent application KR 20130026351 A. "GSMA eSIM Group feedback on the request from ETSI TC SCP" provides a technical description of the GSMA's 'Remote SIM Provisioning (RSP) Architecture for consumer Devices' that applies for eSIM products. US 2020/288300 A1 discloses a server obtaining, from a device having an embedded Subscriber Identification Module (eSIM), a unique identifier of the eSIM. US 2014/038563 A1 discloses a multi-use embedded universal integrated circuit card containing more than one active MNO (mobile network operator) profile. US 2018/206123 A1 discloses a method that control of subscription credentials is delegated from a mobile network operator to an enterprise server.

Using eUICCs gives OEMs as well as end customers the flexibility to select or change service providers (and thus the mobile networks) without having to replace SIM cards, while enabling a wide range of consumer, M2M, and IoT use cases for MNOs, automotive manufacturers, device vendors, and IoT service providers.

As the MNO has a central role, any modifications and changes regarding service providers and profiles have to be performed by the MNO. However, the ever increasing number of connected devices within IoT and M2M applications imposes a high burden on the MNO for generating a multitude of subscriber profiles and downloading the profiles onto the devices. The central role of the MNO will thus cause a bottleneck in the management chain for managing subscriber profiles.

It is therefore desirable to provide a solution for eUICC profile management which addresses the above-mentioned drawbacks.

SUMMARY OF THE INVENTION

According to a first aspect of the present invention, there is provided a method for delegated management of profiles of an embedded Universal Integrated Circuit Card, eUICC. The eUICC is included in a mobile device, which mobile device further comprises a Local Profile Assistant, LPA. In a first step the LPA performs registration of the eUICC with a server. In a further step, the LPA obtains a list of profile identifiers, each profile identifier uniquely identifying a respective profile available for the eUICC. A profile identifier is then selected from the obtained list, and delegated management is added to the profile identified by the selected profile identifier, by joining an existing subscription group of profiles on the server, or by creating a new subscription group on the server based on the selected profile identifier.

Preferably the profile identifier is a unique serial number, ICCID (Integrated Circuit Card ID), uniquely identifying a profile.

The profiles within a subscription group on the server, that is, the profiles which delegated management has been added to, are not under the control of the MNO anymore, but can be managed directly by a third entity, such as a company or business enterprise.

This results in a significant reduction of workload at the MNO, in particular for IoT applications requiring handling of a large number of connected devices and their profiles.

In some embodiments of the present invention, registering the eUICC with the server comprises obtaining an eUICC identifier, EID, from the eUICC, obtaining a public key from the eUICC, generating a certificate signing request, CSR, the CSR comprising the public key, and registering the mobile device together with the EID and CSR with the server.

This allows mutual authentication between the eUICC and the server.

In some embodiments of the present invention, registering the mobile device with the server comprises receiving from the server an acknowledgment message comprising a signed certificate, and storing the certificate.

Preferably, the certificate is signed by a certification authority, such as a GSMA Certificate Issuer, that is, a certification authority accredited by the GSMA. The signed certificate allows for verifying the integrity of the server.

In some embodiments of the present invention, obtaining a list of profile identifiers, comprises checking with the server, whether there is a mobile network operator, MNO, the server being connected to, which provides support for the eUICC. If there is a MNO implementing the functions, a first list of profile identifiers is then received from the MNO. A second list of profile identifiers is received from the eUICC. The first list of profile identifiers and the second list of profile identifiers are then combined to obtain the list of profile identifiers available to the eUICC.

This allows to fetch identifiers of all profiles available at the mobile device, either being provided by various MNOs or already stored on the eUICC of the device.

Preferably, the LPA is instructed to request the list of profiles from the MNO by receiving a command from the server instructing redirection to the MNO.

In some embodiments of the present invention, obtaining the list of profiles from the MNO comprises signing in with the MNO using personal identification data, in particular username and password, stored in the eUICC; receiving from the MNO an authorization token; requesting the list of profile identifiers from the MNO using the authorization token; receiving the first list of profile identifiers from the MNO, wherein the first list comprises profile identifiers and profile names of profiles provided by the MNO; and storing the first list of profile identifiers.

In some embodiments of the present invention, obtaining the second list of profile identifiers from the eUICC comprises sending a GSMA compliant command to the eUICC, and receiving from the eUICC the second list of profiles. Preferably, the second list of profiles contains for each profile installed within the eUICC, profile metadata, in particular a profile identifier ICCID and an International Mobile Subscriber Identity, IMSI, of the eUICC.

In some embodiments of the present invention, the method further comprises establishing by the LPA a secure communication channel with the server prior to adding delegated management to the selected profile. Preferably, the established secure communication channel supports a plurality of security protocols that provide identity authentication and secure, private communication through encryption.

In some embodiments of the present invention, if the list of profile identifiers is obtained from the MNO, joining a subscription group on the server comprises instructing the server to add the selected profile identifier together with the profile name to the subscription group; and creating a subscription group on the server comprises instructing the server to create a new subscription group with a subscription group identifier and to add the profile identifier together with the profile name to the new subscription group.

In some embodiments of the present invention, if the list of profile identifiers is obtained from the eUICC, joining a subscription group on the server comprises instructing the server to add the selected profile identifier together with the IMSI to the subscription group; and creating a subscription group on the server comprises instructing the server to create a new subscription group with a subscription group identifier and to add the profile metadata, in particular ICCID and IMSI, to the new subscription group.

According to a second aspect of the present invention, there is provided an interface for managing profiles of an embedded Universal Integrated Circuit Card, eUICC, included in a mobile device. The interface is located at a server and can be connected to at least one mobile network operator, MNO. The interface is configured to support authentication of the eUICC with the server, to provide creation and management of subscription groups comprising a plurality of profiles at the server, and to provide uploading and/or downloading of profiles to/from the at least one MNO.

In some embodiments of the present invention according to the second aspect, the interface is configured to further support registration of the mobile device with the server, in particular, registration through an application call or through a private invite link.

According to a third aspect of the present invention, there is provided an apparatus, in particular a server, wherein the apparatus is configured to store and manage eUICC profiles provided by at least one mobile network operator, MNO. Preferably, the apparatus comprises the interface according to the second aspect.

In some embodiments of the present invention according to the third aspect, the apparatus is further configured to receive instructions for managing a group of profiles, in particular for performing profile updates, and to upload updated profiles to the at least one MNO. Preferably, the instructions are received from a company through an application call or by accessing a dedicated website.

According to a fourth aspect of the present invention, there is provided a remote eUICC profile management system, comprising a mobile device, the mobile device having an embedded Universal Integrated Circuit Card, eUICC and a Local Profile Assistant, LPA. The system comprises further the server according to the third aspect, wherein the server comprises the interface according to the second aspect. The system is configured to receive from a company a request for delegated management and upon receiving the request for delegated management to implement the method according to the first aspect.

According to a further aspect of the present invention, there is provided a computer program product, comprising instructions which, when the program is executed by a computer, cause the computer to perform authentication and registration of an eUICC with a server, the server comprising an interface for managing a plurality of subscriber profiles of the eUICC, and being connectable to a mobile network operator, MNO; to obtain a list of profile identifiers, each profile identifier uniquely identifying a respective profile available for the eUICC; and to add delegated management to a selected profile identifier, by joining an existing subscription group of profiles on the server, or by creating a new subscription group on the server based on the selected profile identifier.

The aspects and embodiments described herein will allow companies to effectively and efficiently manage mobile network subscriptions that the companies may provide to mobile devices equipped for electronic subscriber profile provisioning, as any modifications and changes regarding service providers and profiles can be performed by the companies themselves through direct access with the server. Furthermore, as the companies can manage, in particular also change/update, the eUICC profiles through the interface located outside the GSMA specification, less profiles have to be uploaded onto the mobile devices.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which

FIGS. 6A and 6B show flow charts for adding delegated management to a free profile, respectively to an installed profile, according to further embodiments.

DETAILED DESCRIPTION

Figure 1:
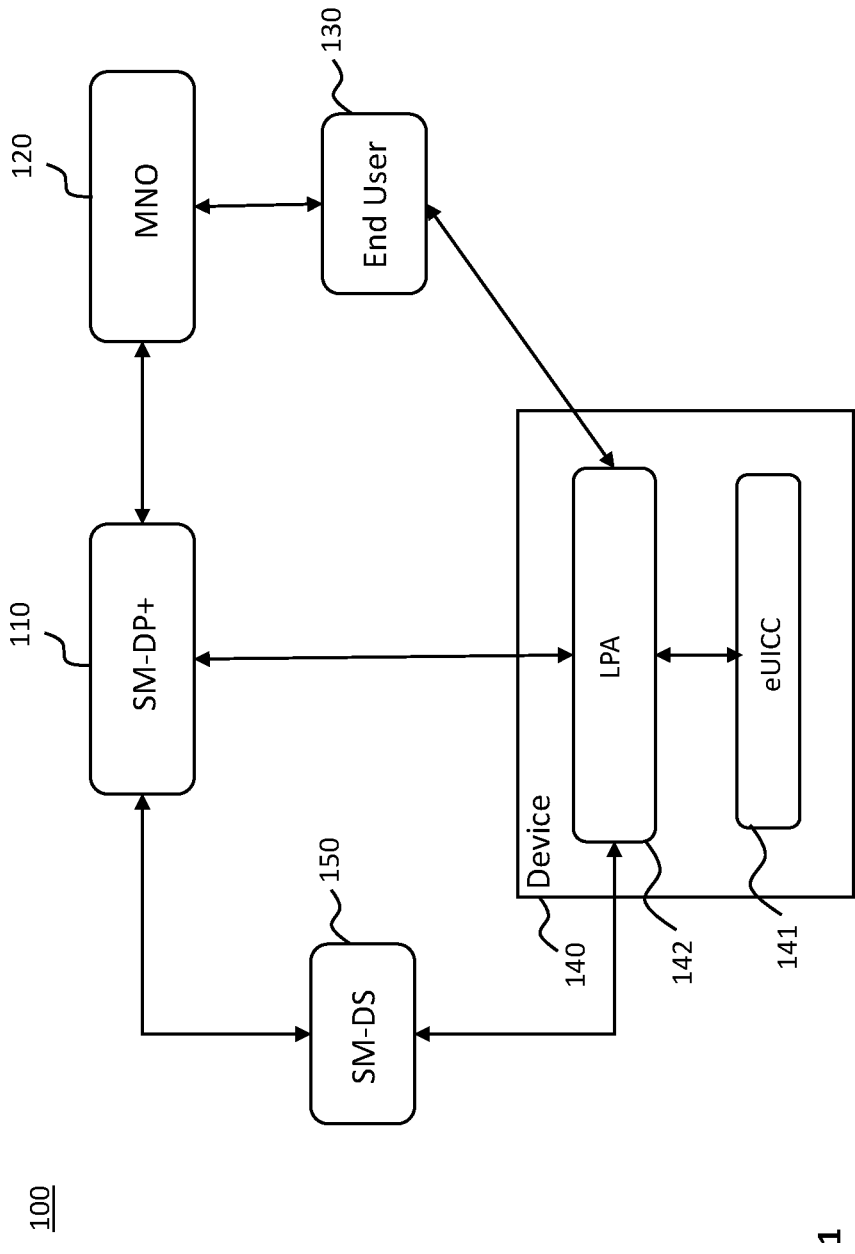
FIG. 1 shows a simplified representation of the architecture of a remote eSIM provisioning system.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Through this specification, the term "eUICC" is understood as an integrated circuit, IC, that is intended to securely store at least one subscription profile having profile data. A profile in an eUICC may host an international mobile subscriber identity number, IMSI, a unique serial number, ICCID, cryptographic encryption/decryption keys, security authentication and ciphering information, temporary information related to the local network, a list of the services the user has access to, and two passwords: a personal identification number (PIN) for ordinary use, and a personal unblocking code (PUK) for PIN unlocking, which are used to uniquely identify and authenticate a subscriber on a terminal device, such as an M2M device, a mobile phone, a personal computer and so on. In addition, a profile in an eUICC may contain a profile name.

The present invention proposes a solution for delegating profile management for a group of profiles from the MNO to a third entity, such as a company or a business enterprise, via a server through a dedicated interface. The interface is located on the server and is therefore outside of the GSMA specification.

Through this application, a group of profiles, which delegated management has been added to, is also referred to as a subscription group.

Figure 2:
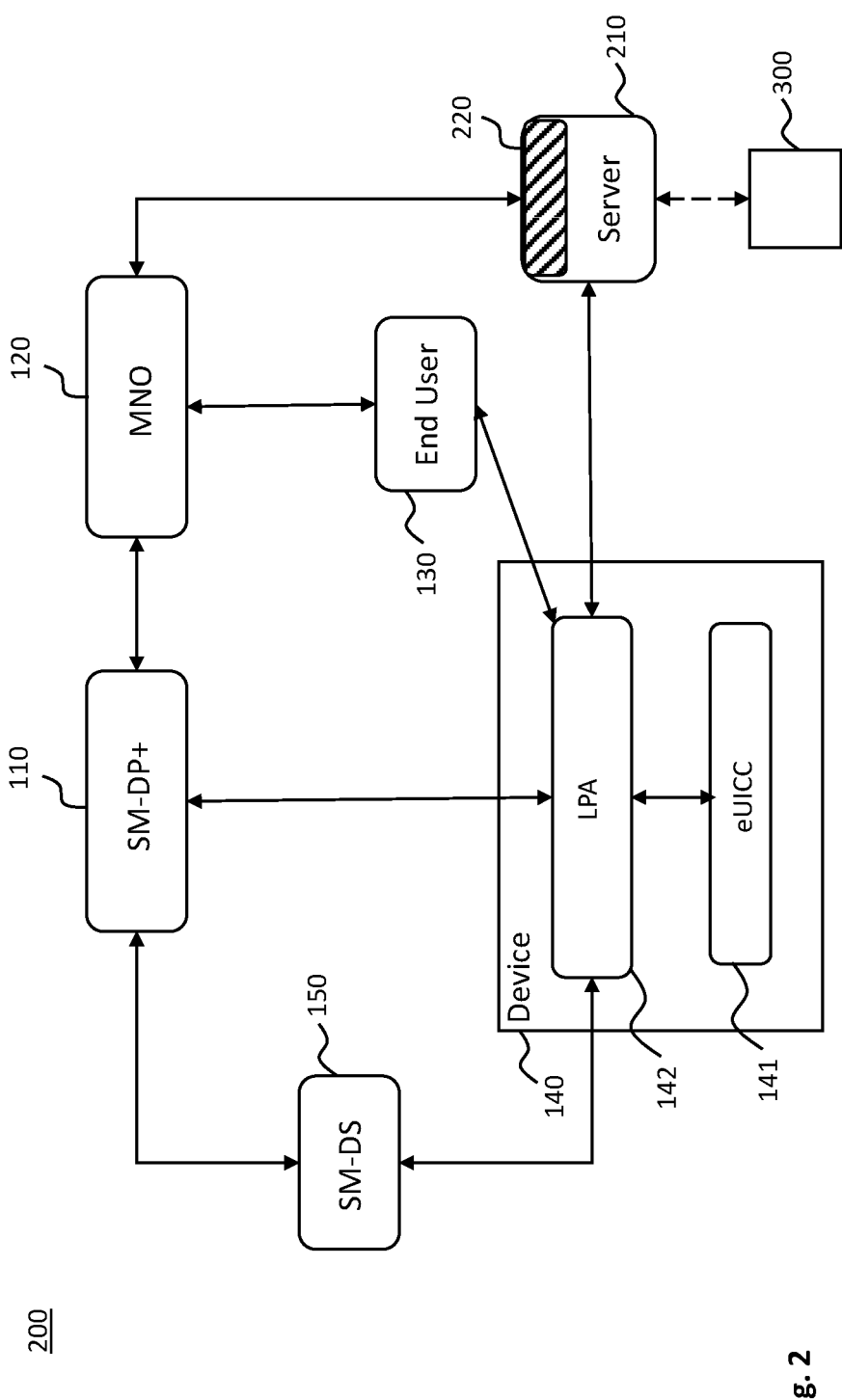
FIG. 2 shows an architecture of a remote eSIM provisioning system according to an embodiment of the invention.

FIG. 2 shows a remote eSIM provisioning system according to an embodiment.

The system 300 comprises, in addition to the components of the known eSIM provisioning system of FIG. 1, a server 210 (also called in the following a Profile-To-Go-Server). The server can be located at a particular company 300, such as a business or enterprise providing mobile devices to employees. The server may be also realized as a virtual cloud server which companies have access to.

An interface 220 is located on the server 210 and allows to manage profiles, update profiles, cancel profiles or buy new profiles by companies. The interface 220 provides authentication for the eUICC with the server 210. Further, the interface 220 provides support for accepting device enrollment in different methods, such as registration of the mobile device containing the eUICC from an application or through a private invite link.

The company 300 may access the server 210 through an application and/or a website to manage the group of profiles, such as, update existing profiles, delete existing profiles, and buying new profiles. Once a profile group has been updated, it will be upstreamed to the MNO 120. The MNO 120 will automatically accept the profiles as they were received through the interface 220. Then according to the GSMA specification, a target device will receive a new profile upon establishing internet connection.

Figure 3:
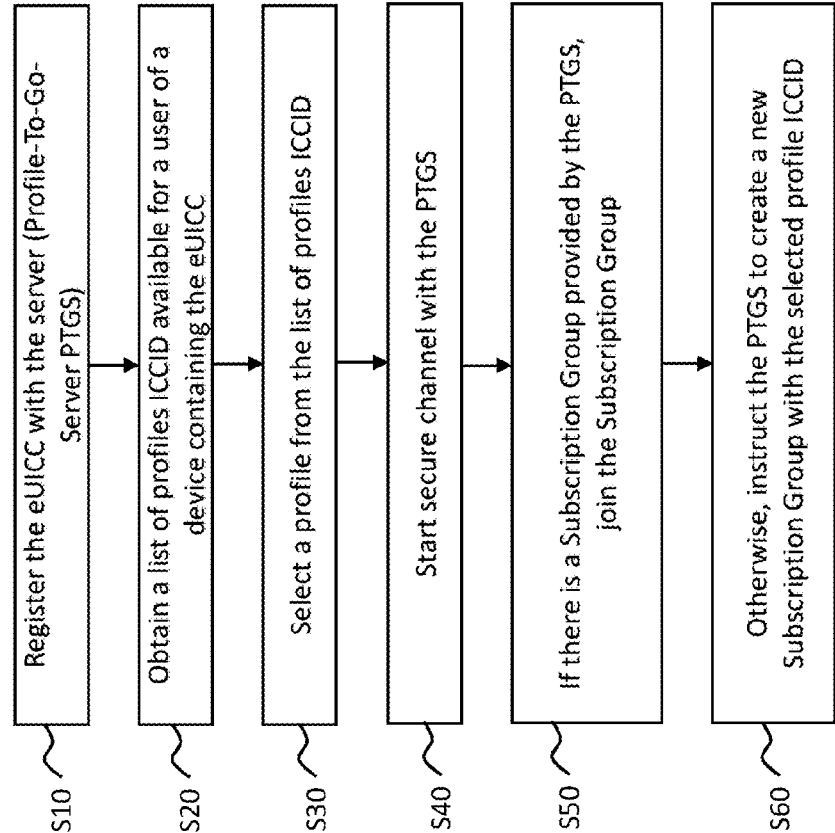
FIG. 3 shows a flow chart of a method for delegated management of profiles of an eUICC according to an embodiment.

FIG. 3 shows a flow chart of a method for delegated management of profiles of an eUICC according to an embodiment. The method may be implemented in the remote eSIM provisioning system 200 of FIG. 2.

In a step S10, the LPA 142 performs registration of the eUICC 141 with the server 210. In step S20, the LPA 142 obtains a list of profiles identifiers, ICCID, each ICCID uniquely identifying a respective profile available for the eUICC 141. A profile ICCID is selected from the obtained list in step S30, and delegated management is added to the profile with the selected ICCID. In particular, delegated management can be added by joining an already established subscription group in step S50, or by creating a subscription group with the selected ICCID in step S60. The subscription groups of profiles ICCID are preferably located on the server.

Implementation details of the steps S50 and S60 will be explained below with reference to FIGS. 6A and 6B, as well as FIGS. 7B and 7C.

Prior to adding delegated management to the selected profile, in a step S40 a secure communication channel may be established between the LPA 142 and the server 210.

Figure 4:
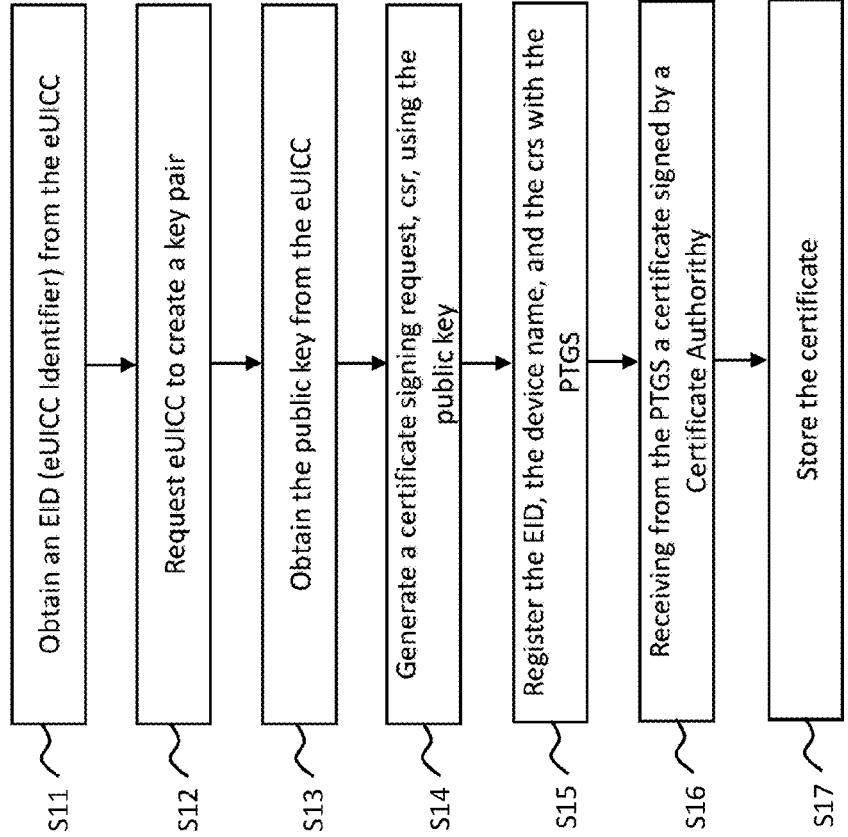
FIG. 4 shows further steps of the method for delegated management of profiles of an eUICC to a server according to an embodiment.
Figure 7A:
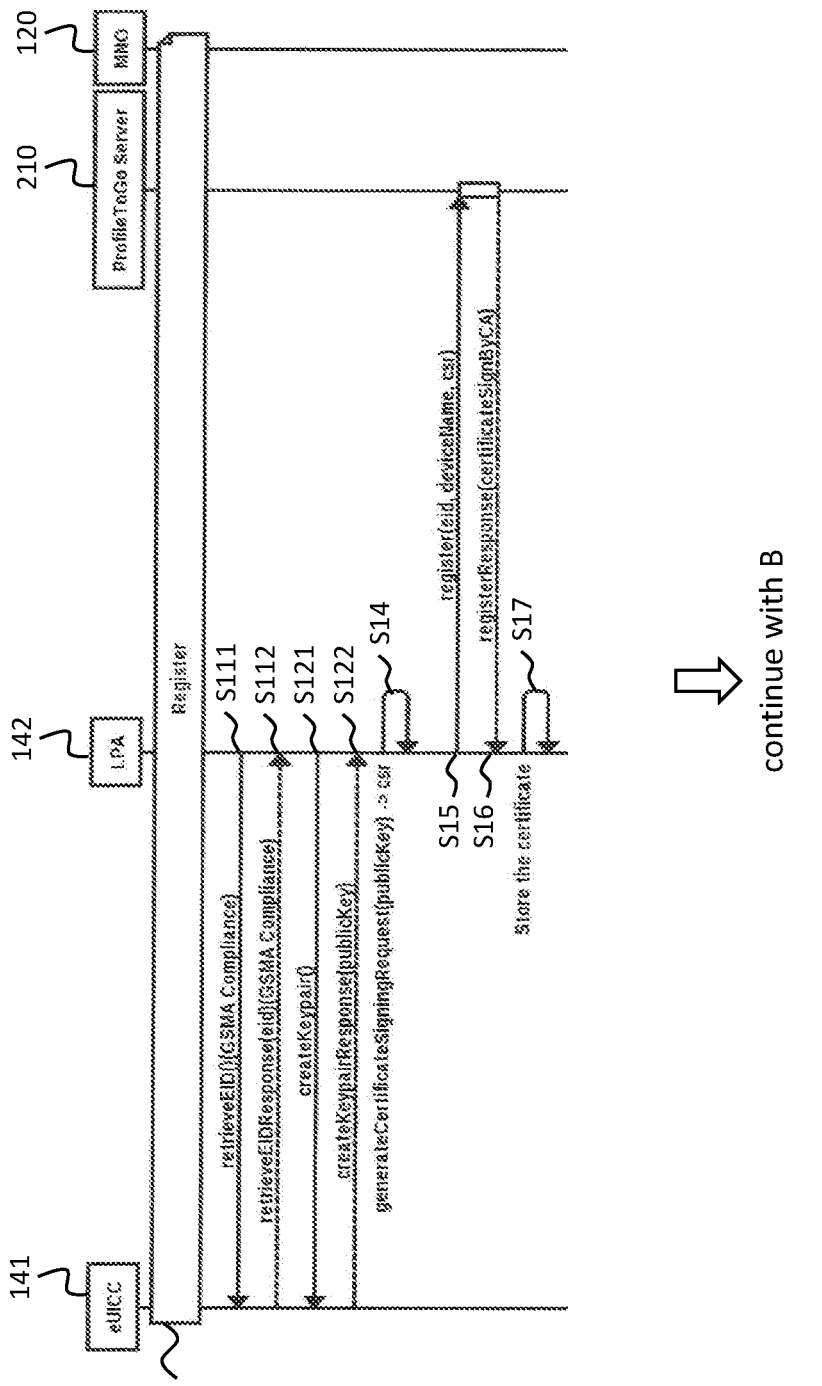
FIGS. 7A, 7B, 7C show respective parts of a signal diagram of a method for delegated management of eUICC profiles according to an embodiment.

FIG. 4 shows sub-steps of a preferred implementation of the registration step S10 in FIG. 3, while FIG. 7A shows a signal diagram of the registration step S10 (identified in FIG. 7A by roman numeral I).

In some embodiments of the present invention, registering the eUICC 141 with the server 220 may comprise in step S11 obtaining from the eUICC an eUICC identifier, EID.

With reference to FIG. 7A, step S11 may be implemented by the LPA 141 by sending a retrieveEID( ) command to the eUICC in step S111, and receiving from the eUICC a retrieveEIDResponse(EID) command in step S112. Both commands may be GSMA compliant commands, as described for instance in the SGP.22 RSP Technical Specification, Version 2.2.2, June 2020.

In step S12, the LPA may request the eUICC to create a key pair, for instance through sending a command createKeypair( ) to the eUICC (step S121 of FIG. 7A) and receiving (in step S122 of FIG. 7A) a createKeyPairResponse(PublicKey), obtaining thus in step S13 the eUICC's public key.

Subsequently, the LPA 141 may generate a certificate signing request, CSR, in step S14. The CSR comprises the public key received in step S121 from the eUICC. In step S15 the LPA may then register the identifier EID, received in step S11 from the eUICC, the CSR, and the device name with the server 210.

Upon performing registration with the server, a certificate is received at the LPA in step S16, and stores in step S17. The certificate is signed by a certification authority, to allow to verify integrity of the server.

Figure 5:
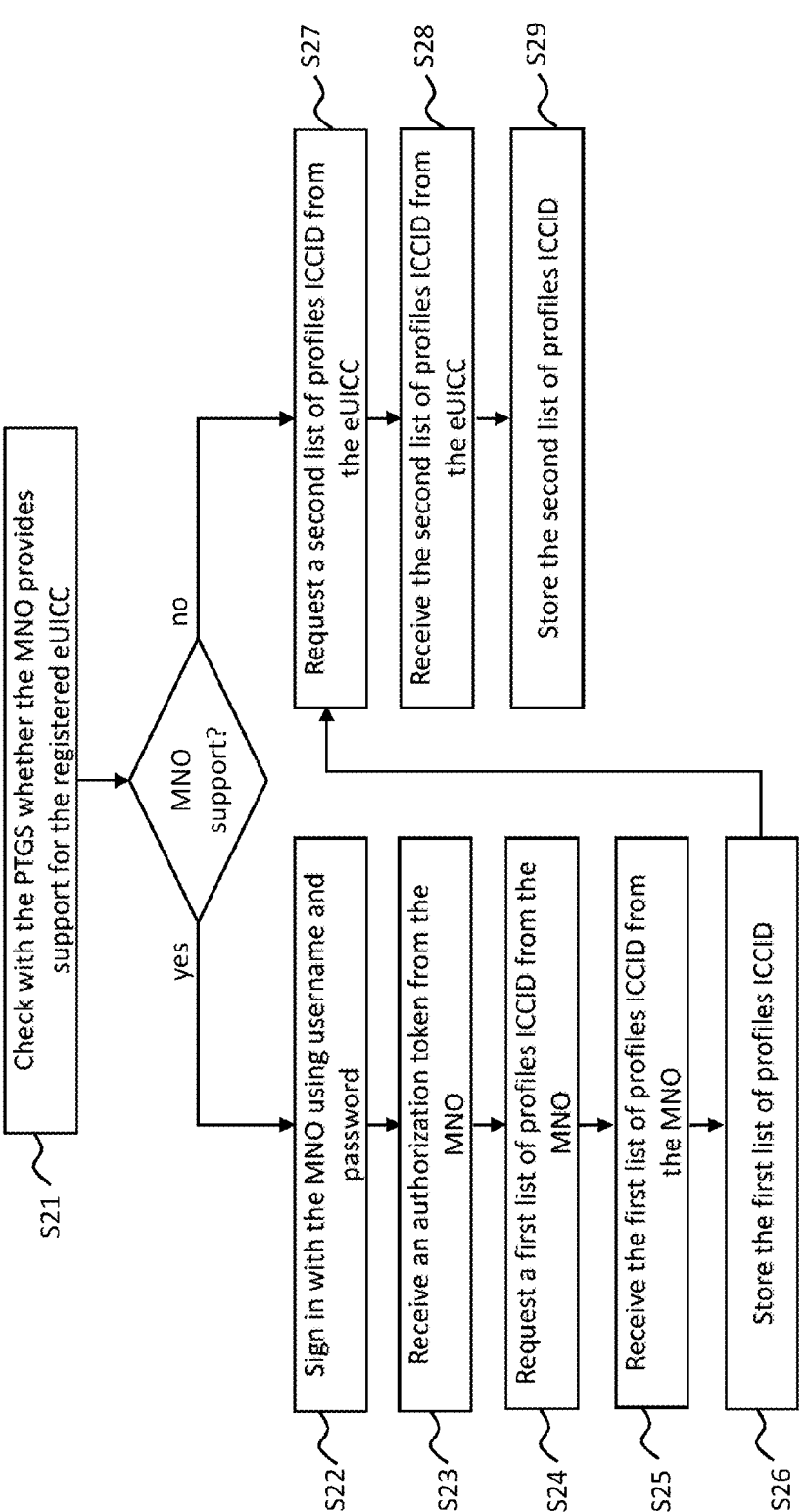
FIG. 5 shows further steps of the method for delegated management of profiles of an eUICC according to an embodiment.

FIG. 5 shows sub-steps of a preferred implementation of step S20 in FIG. 3, of obtaining a list of profiles ICCID available for a user of a device containing the eUICC. The corresponding signal diagram is depicted in FIG. 7B.

Figure 7B:
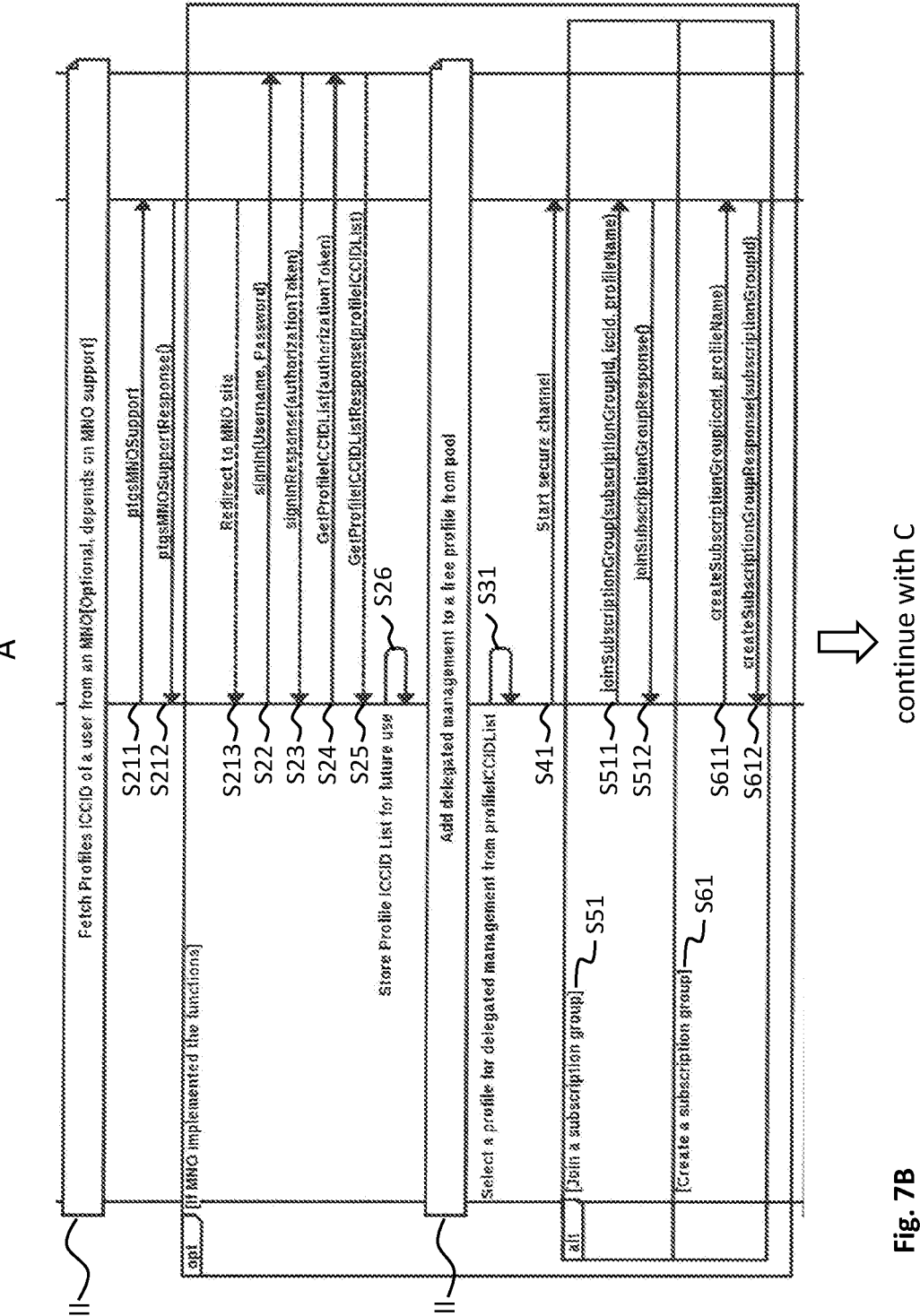
Figure 7C:
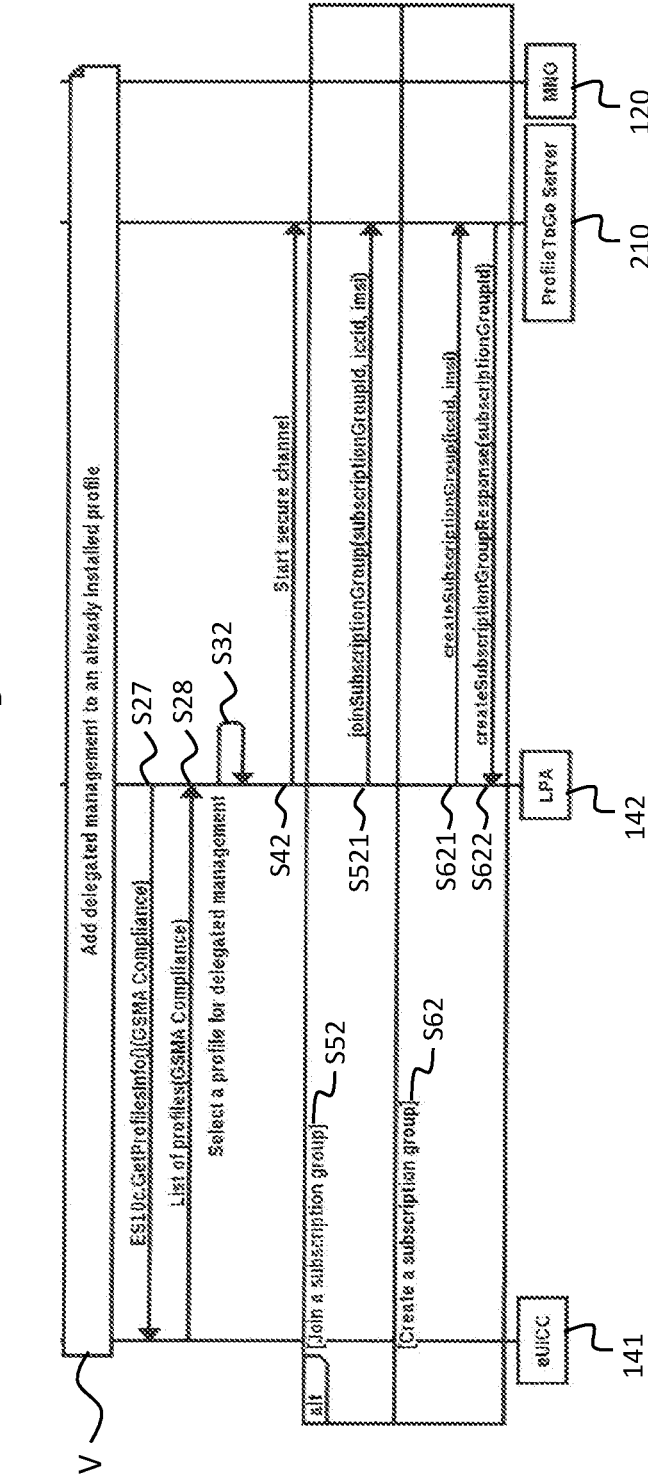

With reference to FIG. 5, steps S27 to S28, and FIG. 7C, the list of profiles ICCID is obtained from the eUICC.

Step S27 may be implemented using conventional GSMA commands described in the SGP.22 RSP Technical Specification, such as, ES10b.GetProfilesInfo, as identified in FIG. 7C by S27.

Optionally, if the MNO provides support for the registered eUICC (the check performed in step S21), the ICCID of the profiles of the corresponding user may be fetched, in addition to obtaining them from the eUICC, from the MNO (steps S22 to S26 of FIG. 5 and part of FIG. 7B identified by roman numeral II). In particular, the LPA 142 may be notified by the server 210 to perform a redirection to the MNO site in step S213. This signal/message prompts the LPA to sign in with the MNO in step S22, with username and password, and to receive a sign-in-acknowledgment from the MNO, containing an authorization token, in step S23. Using this authorization token, the LPA may request from the MNO in step S24 a list of profiles ICCID, and receive the ICCID list is step S25.

The use of the authorization token provides a way to authenticate for the protected profiles once (possibly within a session of limited duration), and uses that token for further authentication during the session.

The obtained list of profiles ICCID can be stored be the LPA in step S26 for future use.

Upon obtaining the list of profiles ICCID, a profile ICCID is selected, and delegated management is added to the corresponding profile identified by the selected ICCID. This is preferably achieved, by adding the selected ICCID to an existing subscription group, or by creating a new subscription group and adding the selected ICCID to the new subscription group. Preferably, a new subscription group is created, if there is no subscription group available for delegated management on the server. Alternatively, several subscription groups can be created and stored at the server.

A profile whose ICCID is added to a subscription group accessible by the server, will be managed in a delegated way, that is by a third company and not by the MNO. With other words, profile management is delegated for a group of profiles from the MNO to a third company.

Preferred embodiments for adding delegated management to a profile are described in the following with reference to FIGS. 6A and 6B. FIG. 6A shows a flow chart for adding delegated management to a free profile, while FIG. 6B shows a flow chart for adding delegated management to an installed profile. The corresponding signal diagrams are FIG. 7B, the lower part, identified by roman numeral III, and FIG. 7C (roman numeral IV). A free profile refers to a profile supported by the MNO, which has not been downloaded and installed at the eUICC. An already installed profile refers to a profile already downloaded and installed at the eUICC.

With reference to FIG. 6A and part III of FIG. 7B, in step S31 a profile ICCID is selected from the list of profiles ICCID received from the MNO, to which delegated management is to be added.

In step S41, a secure channel is established between the LPA 142 and the server 210.

If the list of profiles ICCID is obtained from the MNO, a free profile is selected in step S31 for which delegated management is to be added. That is, a profile is selected and removed from the area of control of the MNO, to be managed by the company 300. If there is already a subscription group established on the server, which support delegated management for the profiles identified therein, the server is instructed to add the selected profile ICCID together with the profile name to this subscription group, in step S51.

The corresponding signaling may comprise sending a request joinSubscriptionGroup(subscriptionGroupID, ICCID, profileName) command to the server, as illustrated by step S511 in FIG. 7B. The subscriptionGroupID is an identifier identifying the subscription group, ICCID is the identifier of the selected profile, and profileName the name of the selected profile. A joinSubscriptionGroupResponse( ) received in step S512 from the server acknowledge the request.

If a new subscription group is to be created for delegated management (step S61 in FIG. 6A), a createSubscriptionGroup(ICCID, profileName) command is sent to the server in step S611 in FIG. 7B, wherein ICCID is the identifier, and profileName the name of the selected profile. In step S612 a confirmation response is received at the LPA from the server, comprising an identifier of the created subscription group.

If the list of profiles ICCID is obtained from the eUICC, the procedure is similar to the above case, with the notable difference in the implementation of the steps of joining an existing subscription group respectively creating a new subscription group, as will be described below with reference to FIGS. 6B and 7C. In particular, the profile IMSI is considered instead of the profile name.

That is, if there is already a subscription group established on the server, which support delegated management for the profiles identified therein, the server is instructed to add the selected profile ICCID together with the profile IMSI to this subscription group, in step S52.

The corresponding signaling in FIG. 7C may comprise sending a request joinSubscriptionGroup(subscriptionGroupID, ICCID, IMSI) command to the server, step S511.

If a new subscription group is to be created for delegated management (step S62 in FIG. 6B), a createSubscriptionGroup(ICCID, IMSI) command is sent to the server in step S621 in FIG. 7C. In step S622 a confirmation response is received at the LPA from the server, comprising an identifier of the created subscription group.

The methods, interface and apparatus as described through the embodiments above, allow to delegate management of group of profiles to a third party, such as a company providing mobile devices equipped with eUICCs. By delegating management of eUICC profiles to a third company through the server and the dedicated interface, the workload imposed on the MNO caused by handling the large number of connected devices and their profiles is substantially reduced.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for delegated management of profiles of an embedded Universal Integrated Circuit Card, eUICC, included in a mobile device, the mobile device further comprising a Local Profile Assistant, LPA, the method comprising:

registering, by the LPA the eUICC with a server;

obtaining, at the LPA, a list of profile identifiers, each profile identifier uniquely identifying a respective profile available for the eUICC;

selecting, by the LPA, a profile identifier from the obtained list; and adding delegated management to a profile identified by the selected profile identifier, by joining, as instructed by the LPA, with the selected profile identifier an existing subscription group of profiles on the server, or by creating, as instructed by the LPA, a new subscription group on the server based on the selected profile identifier, wherein the profiles within a subscription group on the server that is, the profiles which delegated management has been added to, are not under the control of an MNO anymore, but can be managed directly by a third entity.

2. The method according to claim 1, wherein registering the eUICC with the server comprises:

obtaining an eUICC identifier, EID, from the eUICC;

obtaining a public key from the eUICC;

generating a certificate signing request, CSR, the CSR comprising the public key; and registering the mobile device together with the EID and CSR with the server.

3. The method according to claim 1, wherein registering the eUICC with the server comprises receiving from the server an acknowledgment message comprising a signed certificate and storing the certificate.

4. The method according to claim 1, wherein obtaining a list of profile identifiers, comprises:

checking with the server, whether there is a mobile network operator, MNO, the server being connected to, which provides support, in particular implements functions for the eUICC;

if there is a MNO implementing the functions, obtaining a first list of profile identifiers from the MNO;

obtaining a second list of profile identifiers from the eUICC; and combining the first list with the second list to obtain the list of profile identifiers.

5. The method according to claim 4, wherein obtaining the first list of profiles from the MNO comprises:

signing in with the MNO using personal identification data, in particular username and password, stored in the eUICC;

receiving from the MNO an authorization token;

requesting the first list of profile identifiers from the MNO using the authorization token;

receiving the first list of profile identifiers from the MNO, wherein the first list comprises profile identifiers and profile names of profiles provided by the MNO; and storing the first list of profile identifiers.

6. The method according to claim 4, wherein obtaining the second list of profile identifiers from the eUICC comprises:

sending a GSMA compliant command to the eUICC; and receiving from the eUICC the second list of profiles, wherein the second list of profiles contains for each profile installed within the eUICC, profile metadata, in particular a profile identifier ICCID and an International Mobile Subscriber Identity, IMSI, of the eUICC.

7. The method according to claim 1, further comprising establishing by the LPA a secure communication channel with the server prior to adding delegated management to the selected profile.

8. The method according to claim 4, wherein if the list of profile identifiers is obtained from the MNO:

joining a subscription group on the server comprises instructing the server to add the selected profile identifier together with the profile name to the subscription group; and creating a subscription group on the server comprises instructing the server to create a new subscription group with a subscription group identifier and to add the profile identifier together with the profile name to the new subscription group.

9. The method according to claim 4, wherein if the list of profile identifiers is obtained from the eUICC:

joining a subscription group on the server comprises instructing the server to add the selected profile identifier together with the IMSI to the subscription group; and creating a subscription group on the server comprises instructing the server to create a new subscription group with a subscription group identifier and to add the profile metadata, in particular ICCID and IMSI, to the new subscription group.

10. An interface for managing profiles of an embedded Universal Integrated Circuit Card, eUICC, included in a mobile device, the interface being located at a server and connectable to at least one mobile network operator, MNO, wherein the interface is configured to:

support authentication of the eUICC with the server, wherein a registration of the eUICC allows authentication;

provide creation and management of subscription groups comprising a plurality of profiles, wherein the profiles within the subscription group on the server, that is, the profiles which delegated management has been added to, are not under the control of an MNO anymore, but can be managed directly by a third entity; and provide uploading and/or downloading of profiles to/from the at least one MNO.

11. The interface according to claim 10, further configured to support registration of the mobile device with the server, in particular, registration through an application call or through a private invite link.

12. An apparatus, in particular a server, configured to store and manage eUICC profiles provided by at least one mobile network operator, MNO, the apparatus comprising the interface according to claim 10.

13. The apparatus according to claim 12, further configured to receive instructions for managing a group of profiles, in particular for performing profile updates, and to upload updated profiles to the at least one MNO.

14. A remote eUICC profile management system, comprising:

a mobile device, the mobile device comprising an embedded Universal Integrated Circuit Card, eUICC, and a Local Profile Assistant, LPA;

the server comprising the interface according to claim 10;

wherein the system is configured to receive from a company a request for delegated management and upon receiving the request for delegated management, to implement a method for delegated management of profiles of an embedded Universal Integrated Circuit Card, eUICC, included in a mobile device, the mobile device further comprising a Local Profile Assistant, LPA, the method comprising:

registering, by the LPA the eUICC with a server;

obtaining, at the LPA, a list of profile identifiers, each profile identifier uniquely identifying a respective profile available for the eUICC;

selecting, by the LPA, a profile identifier from the obtained list; and adding delegated management to a profile identified by the selected profile identifier, by joining, as instructed by the LPA, with the selected profile identifier an existing subscription group of profiles on the server, or by creating, as instructed by the LPA, a new subscription group on the server based on the selected profile identifier, wherein the profiles within a subscription group on the server that is, the profiles which delegated management has been added to, are not under the control of an MNO anymore, but can be managed directly by a third entity.

15. A computer program product, comprising instructions which, when the program is executed by a computer, cause an LPA within a mobile device to:

perform registration of an eUICC with a server;

obtain a list of profile identifiers, each profile identifier uniquely identifying a respective profile available for the eUICC; and select a profile identifier from the obtained list; and add delegated management to a profile identified by the selected profile identifier, by joining an existing subscription group of profiles on the server, or by creating a new subscription group on the server based on the selected profile identifier, wherein the profiles within a subscription group on the server that is, the profiles which delegated management has been added to, are not under the control of an MNO anymore, but can be managed directly by a third entity.

* * * * *